United States Patent
Eriksen et al.

(10) Patent No.: US 10,523,287 B1
(45) Date of Patent: Dec. 31, 2019

(54) TRANSMISSION PARAMETER ASSIGNMENT FOR MU-MIMO WIRELESS DEVICES

(71) Applicant: Telefonaktiebolaget LM Ericsson (publ), Stockholm (SE)

(72) Inventors: Mariell Eriksen, Lund (SE); Dino Pjanic, Malmö (SE); Fredrik Saarnak, Löddeköpinge (SE); Juan Serrato Vital, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/202,387

(22) Filed: Nov. 28, 2018

(51) Int. Cl.
*H04B 7/04* (2017.01)
*H04B 7/0417* (2017.01)
*H04B 7/06* (2006.01)
*H04B 7/0452* (2017.01)

(52) U.S. Cl.
CPC ......... *H04B 7/0417* (2013.01); *H04B 7/0452* (2013.01); *H04B 7/063* (2013.01)

(58) Field of Classification Search
CPC ... H04B 1/38; H04B 7/02; H04B 7/04; H04B 7/06; H04B 7/063; H04B 7/0417; H04B 7/0452; H04B 7/0456; H04B 7/0486; H04B 7/0626; H04B 17/12; H04B 17/309; H04L 1/00; H04L 1/16; H04L 1/0026; H04L 5/00; H04L 5/14; H04L 12/26; H04L 27/00; H04W 8/18; H04W 8/20; H04W 36/30; H04W 52/52; H04W 72/00; H04W 72/04; H04W 72/06; H04W 72/0453; H04W 72/1263; H04W 74/08
USPC ............... 370/252, 329, 330, 332, 334, 342; 375/219, 260, 267, 295, 316; 455/101, 455/103, 509, 513
See application file for complete search history.

(56) References Cited

U.S. PATENT DOCUMENTS

| | | | | |
|---|---|---|---|---|
| 2011/0111761 | A1* | 5/2011 | Luo | H04B 1/7107 455/450 |
| 2012/0093089 | A1* | 4/2012 | Park | H04B 7/0417 370/328 |
| 2015/0236767 | A1* | 8/2015 | Maruta | H04B 7/0452 375/267 |
| 2016/0057611 | A1* | 2/2016 | Gong | H04B 7/0452 370/329 |
| 2018/0324801 | A1* | 11/2018 | Sampathkumar | H04B 7/0452 |
| 2018/0375560 | A1* | 12/2018 | Wei | H04L 1/0026 |

OTHER PUBLICATIONS

VaN Veen, B. et al., "Beamforming: A Versatile Approach to Spatial Filtering", IEEE ASSP magazine, vol. 5, Issue: 2, Apr. 1, 1998, pp. 1-21, IEEE.

(Continued)

*Primary Examiner* — Shawkat M Ali
(74) *Attorney, Agent, or Firm* — Coats & Bennett, PLLC

(57) ABSTRACT

A network node assigns a transmission parameter, e.g., an Antenna Port Identifier (APID) and a Scrambling Code Identifier (SCID) combination, to each of a plurality of wireless devices responsive to the channel correlations between each pair of wireless devices formed from the plurality of wireless devices, to facilitate the transmission of data from the network node to each wireless device. Such intelligent transmission parameter assignment reduces interference and/or improves throughput.

27 Claims, 7 Drawing Sheets

(56) References Cited

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 15)", Technical Specification, 3GPP TS 36.213 V15.3.0, Sep. 1, 2018, pp. 59-278, 3GPP, France.

3rd Generation Partnership Project, "3rd Generation Partnership Project; Technical Specification Group Radio Access Network; Evolved Universal Terrestrial Radio Access (E-UTRA); Physical channels and modulation (Release 15)", 3GPP TS 23.211 V15.3.0, Sep. 1, 2018, pp. 94-187, 3GPP, France.

* cited by examiner

TRANSMISSION PARAMETER ASSIGNMENT FOR MU-MIMO WIRELESS DEVICES

TECHNICAL FIELD

The solution presented herein relates generally to wireless communication systems, and more particularly to the control of transmission parameters used to encode signals transmitted to a wireless device to improve throughput and/or reduce interference.

BACKGROUND

A network node, e.g., a base station, encodes signals for transmission to co-scheduled wireless devices to enable each receiving wireless device to decode the received signal intended for it. To that end, the network node encodes signals using encoding parameters assigned to the corresponding wireless device.

When the network node has a sufficient number of unique encoding parameters, the network node is able to improve wireless communication performance by assigning each wireless device a unique encoding parameter. However, when there are not enough encoding parameters to enable the network node to assign each wireless device a unique encoding parameter, interference and throughput issues may degrade the performance of the network. This is particularly true for Multi-User, Multiple Input-Multiple Output (MU-MIMO) systems. Thus, there remains a need for encoding parameter solutions that optimize the performance of the network.

SUMMARY

Per the solution presented herein, a network node assigns a transmission parameter, e.g., a combination of an Antenna Port Identifier (APID) and a Scrambling Code Identifier (SCID), to each of a plurality of wireless devices responsive to the channel correlations between each pair of wireless devices formed from the plurality of wireless devices to facilitate the transmission of data from the network node to each wireless device. In so doing, the solution presented herein reduces interference and/or improves throughput. The network node may estimate the channel correlations for each pair by explicitly calculating the channel correlation for each pair, or the network node may indirectly estimate the channel correlations by calculating a variable representative of the channel correlation, e.g., an orthogonality factor. As used herein, a transmission parameter comprises a set of identifiers, e.g., a first identifier and a second identifier, where the network node uses the identifiers to code a signal for transmission to the corresponding wireless device, and where the wireless device uses the identifiers to decode the received signal. Exemplary identifiers used for the transmission parameter include, e.g., an Antenna Port Identifier (APID) and a Scrambling Code Identifier (SCID).

One exemplary embodiment comprises a method implemented by a network node for configuring a plurality of wireless devices in a Multi-User Multiple-Input, Multiple-Output (MU-MIMO) wireless communication network to receive transmissions from the network node. The method comprises, for each pair of wireless devices, estimating a channel correlation of a first channel between the network node and one wireless device in the pair and a second channel between the network node and the other wireless device in the pair. Each pair of wireless devices comprises one of all possible combinations of two of the plurality of wireless devices. The method further comprises assigning one of a plurality of transmission parameters to each of the plurality of wireless devices responsive to the channel correlations to reduce interference between the plurality of wireless devices. Each transmission parameter is a unique combination of a first identifier and a second identifier, where the first and second identifiers are used to code and/or decode a signal. The method further comprises configuring each of the plurality of wireless devices to receive transmissions encoded with the assigned transmission parameter.

According to one exemplary embodiment, the first identifier is an antenna port identifier. Further, in some embodiments, the second identifier is a scrambling code identifier.

According to one exemplary embodiment, assigning one of the plurality of transmission parameters to each of the plurality of wireless devices comprises assigning, to the wireless devices in the pair of wireless devices having the highest channel correlation, a first transmission parameter to one of the wireless devices in the pair and a second transmission parameter to the other of the wireless devices in the pair, where the second transmission parameter has a different first identifier than the first transmission parameter.

According to one exemplary embodiment, assigning one of the plurality of transmission parameters to each of the plurality of wireless devices comprises assigning, to the wireless devices in the pair of wireless devices having the lowest channel correlation, a first transmission parameter to one of the wireless devices in the pair and a second transmission parameter to the other of the wireless devices in the pair, where the second transmission parameter has the same first identifier as the first transmission parameter.

One exemplary embodiment comprises a network node in a Multi-User Multiple-Input, Multiple-Output (MU-MIMO) wireless communication network configured to send transmissions to a plurality of wireless devices. The network node comprises processing circuitry configured to, for each pair of wireless devices, estimate a channel correlation of a first channel between the network node and one wireless device in the pair and a second channel between the network node and the other wireless device in the pair. Each pair of wireless devices comprises one of all possible combinations of two of the plurality of wireless devices. The processing circuitry is further configured to assign one of a plurality of transmission parameters to each of the plurality of wireless devices responsive to the channel correlations to reduce interference between the plurality of wireless devices. Each transmission parameter is a unique combination of a first identifier and a second identifier, where the first and second identifiers are used to code and/or decode a signal. The processing circuitry is further configured to configure each of the plurality of wireless devices to receive transmissions encoded with the assigned transmission parameter.

One exemplary embodiment comprises a computer program product for controlling a network node in a Multi-User Multiple-Input, Multiple-Output (MU-MIMO) wireless communication network configured to send transmissions to a plurality of wireless devices. The computer program product comprises software instructions which, when run on processing circuitry in the network node, causes the network node to, for each pair of wireless devices, estimate a channel correlation of a first channel between the network node and one wireless device in the pair and a second channel between the network node and the other wireless device in the pair. Each pair of wireless devices comprises one of all possible combinations of two of the plurality of wireless devices. The software instructions, when run on the processing circuitry in the network node, further causes the network node to assign one of a plurality of transmission parameters to each of the plurality of wireless devices responsive to the channel correlations to reduce interference between the plurality of wireless devices. Each transmission parameter is a unique combination of a first identifier and a second identifier, where the first and second identifiers are used to code and/or decode a signal. The software instructions, when run on the processing circuitry in the network node, further causes the network node to configure each of the plurality of wireless devices to receive transmissions encoded with the assigned transmission parameter.

One exemplary embodiment comprises a computer-readable medium comprising the computer program product. In one exemplary embodiment, the computer-readable medium comprises a non-transitory computer readable medium.

One exemplary embodiment comprises a network node in a Multi-User Multiple-Input, Multiple-Output (MU-MIMO) wireless communication network configured to send transmissions to a plurality of wireless devices. The network node comprises a transmission parameter unit/module/circuit, a channel correlation unit/module/circuit, an assignment unit/module/circuit, and a configuration unit/module/circuit. The transmission parameter unit/module/circuit defines a plurality of transmission parameters, where each transmission parameter is a unique combination of a first identifier and a second identifier, where the first and second identifiers are used to code and/or decode a signal. It will be appreciated that the transmission parameter unit/module/circuit may be optional, as other nodes may provide the transmission parameters, which the network node stores in memory. The channel correlation unit/module/circuit is configured to, for each pair of wireless devices, estimate a channel correlation of a first channel between the network node and one wireless device in the pair and a second channel between the network node and the other wireless device in the pair. Each pair of wireless devices comprises one of all possible combinations of two of the plurality of wireless devices. The assignment unit/module/circuit is configured to assign one of a plurality of transmission parameters to each of the plurality of wireless devices responsive to the channel correlations to reduce interference between the plurality of wireless devices. The configuration unit/module/circuit is configured to configure each of the plurality of wireless devices to receive transmissions encoded with the assigned transmission parameter.

DETAILED DESCRIPTION

In coordination with the figures, the following detailed description describes the solution presented herein both generally and with specific examples. The examples presented herein are for illustration purposes only, and should not be construed as limiting. With respect to the figures, dashed lines are generally used to indicate optional elements, steps, and/or implementations.

Figure 1:
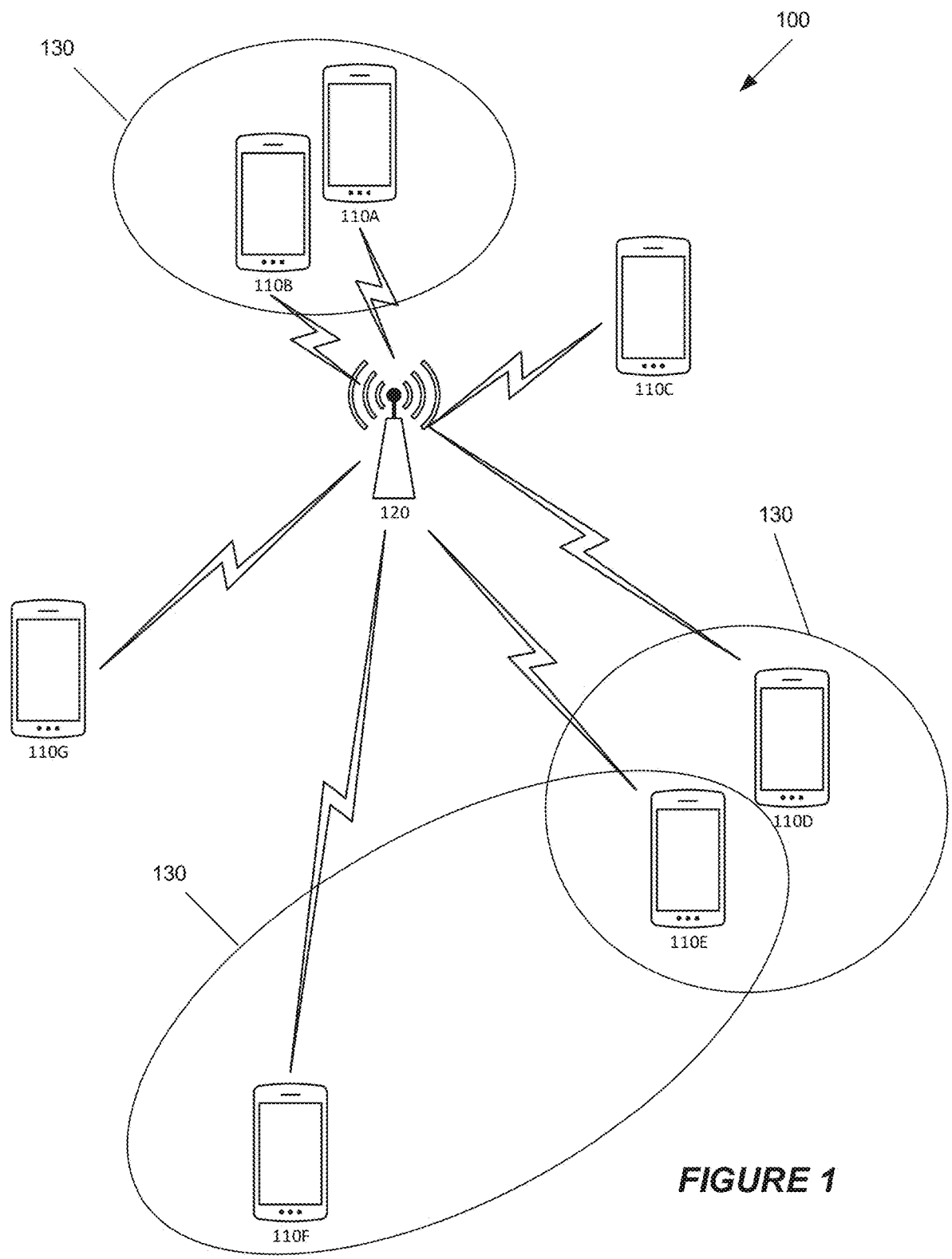
FIG. 1 shows a wireless network according to one exemplary embodiment.

Wireless communication networks include at least one network node, e.g., a base station, which typically transmits downlink (DL) signals to multiple wireless devices, and receives uplink (UL) signals from the wireless devices. FIG. 1 shows one exemplary wireless network 100 comprising a network node 120 and a plurality of wireless devices. To simplify the disclosure of the solution presented herein, a wireless device and/or the wireless devices is/are generally referenced herein with 110, while specific wireless devices are referenced herein with 110x when necessary, where x is a particular letter representation, e.g., A, B, etc.

Network node 120 encodes signals for transmission to co-scheduled wireless devices 110. To enable each receiving wireless device 110 to decode the received signal intended for it, the network node 120 assigns a transmission parameter to each wireless device 110. Each transmission parameter comprises at least two identifiers, e.g., first and second identifiers, that the network node 120 collectively uses to encode signals for transmission to the corresponding wireless device 110. The wireless device 110 uses the assigned transmission parameter to decode its intended received signals. For example, the network node 120 may assign an Antenna Port IDentifier (APID) and a Scrambling Code IDentifier (SCID) to a wireless device 110, which the network node 120 uses to encode signals transmitted to the wireless device 110, and which the wireless device 110 uses to decode its intended signals received from the network node 120.

The following describes the solution presented herein in terms of assigning an APID and an SCID, referred to herein as an APID/SCID combination, to a wireless device 110. It will be appreciated, however, that the solution presented herein is not limited to APID and/or SCID transmission parameters. Other transmission parameters may also be used according to the solution presented herein.

In 3rd Generation Partnership Project (3GPP) Long Term Evolution (LTE) Time Division Duplex (TDD), an LTE 4G technology, there are two APIDs and two SCIDs available to the network node 120, assuming Rank 1, e.g., for Transmission Mode 8. Thus, the following four unique transmission parameters (i.e., unique combinations of APIDs and SCIDs) are available to the network node 120:

TABLE 1

| APID | SCID |
|------|------|
| 0 | 0 |
| 1 | 1 |
| 0 | 1 |
| 1 | 0 |

Figure 5:
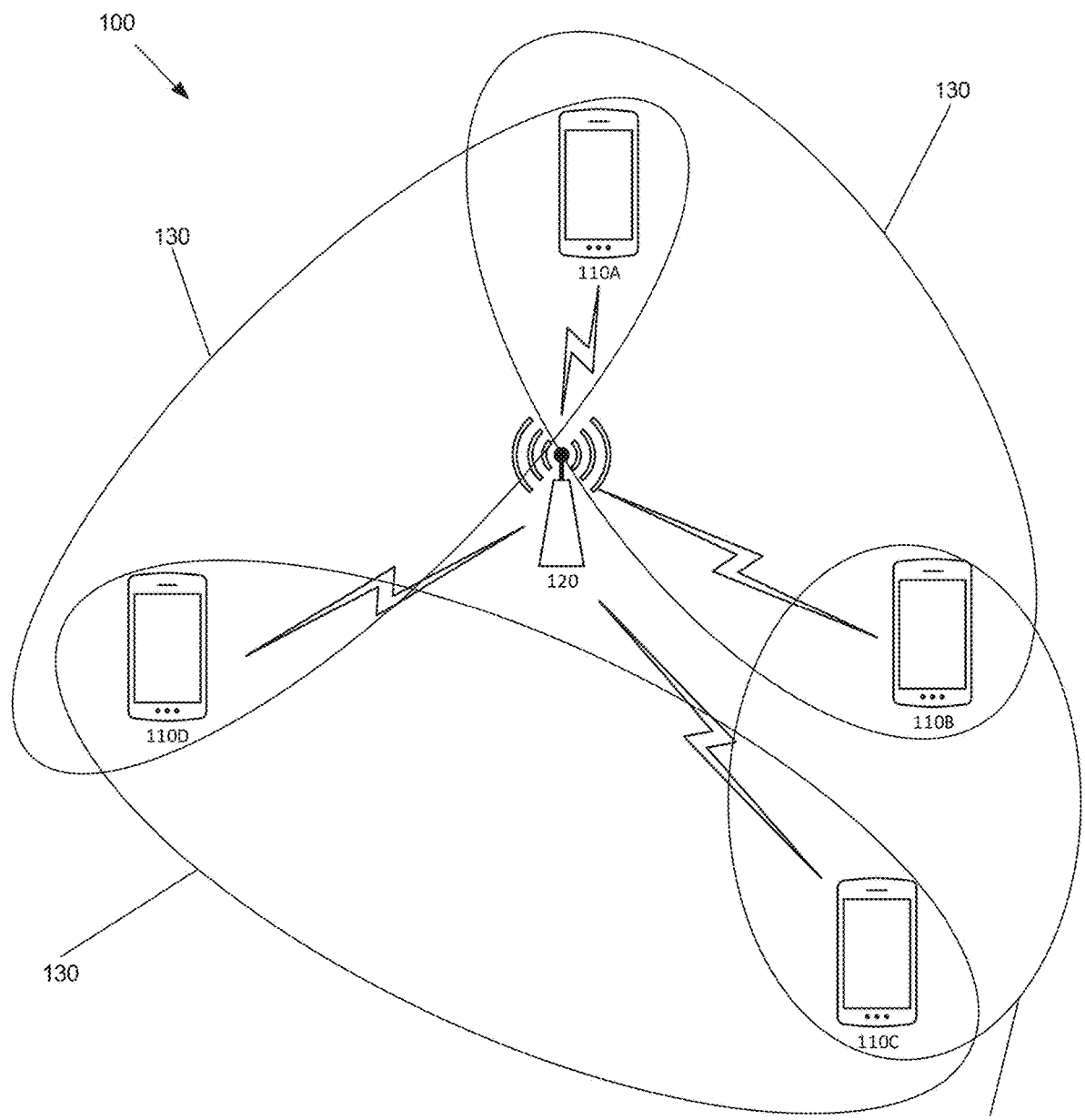
FIG. 5 shows a wireless network for an exemplary implementation of the solution presented herein according to one exemplary embodiment.

When the network node 120 is responsible for four or fewer wireless devices 110, e.g., as in FIG. 5, the network node 120 is able to assign a different APID/SCID combination to each wireless device 110. In reality, however, the network node 120 schedules more than four wireless devices 110, e.g., in Multiple User, Multiple Input-Multiple Output (MU-MIMO) systems. Under these circumstances, the network node 120 reuses APID/SCID combinations as it is not possible for the network node 120 to assign a different APID/SCID combination to each wireless device 110.

In some instances, e.g., Transmission Mode 8 (TM8), using specific APID/SCID combinations and/or reusing different APID/SCID combinations causes interference from the other wireless devices 110, and thereby degrades throughput. To reduce this interference, the network node 120 may use beamforming to spatially separate the signals meant for different wireless devices 110. However, it is not always possible for the network node 120 to implement beamforming that secures orthogonality towards the diversity antenna for each wireless device 110, which reduces interference, particularly for wireless devices 110 that are spatially close to each other. For example, when the network node 120 forms beams based on uplink (UL) channel estimates, many wireless devices 110 can only transmit from the main antenna. The energy that leaks to the diversity antenna is directly proportional to the channel correlation experienced between a pair of wireless devices 110 on their main antennas, respectively, where the amount of energy that leaks increases as the channel correlation increases. As such, for wireless devices 110 spatially close to each other, which have a higher likelihood of experiencing highly correlated channels, beamforming is often insufficient for solving the interference problem.

The solution presented herein addresses this problem by considering spatial positioning of the wireless devices 110 in general, and channel correlation in particular, when assigning a transmission parameter (e.g., APID/SCID combinations) to each wireless device 110. In so doing, the solution presented herein improves the orthogonality of signals transmitted to the co-scheduled wireless devices 110, which reduces interference and/or improves throughput, particularly for those wireless devices that are spatially close to each other. It will be appreciated that the solution presented herein may be used for any number of wireless communication systems, including but not limited to, for TM8, TM9, and/or TM10 wireless devices in DL MU-MIMO systems.

Figure 2:
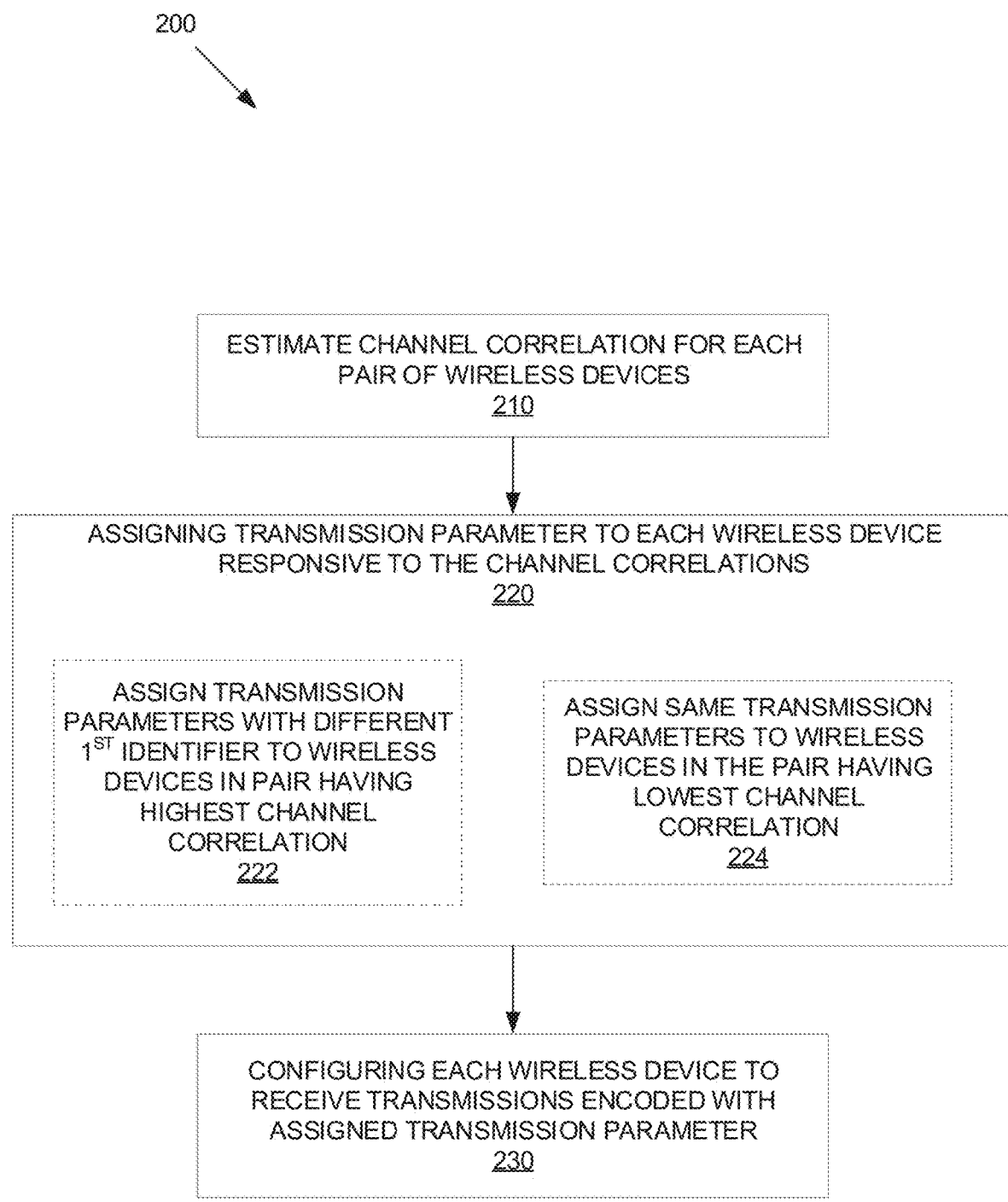
FIG. 2 shows a method of configuring a plurality of wireless devices in the wireless network according to one exemplary embodiment.

FIG. 2 shows one exemplary method 200 according to the solution presented herein. The method 200 includes the network node 120 estimating the channel correlations for each pair 130 of wireless devices 110 served/scheduled by the network node 120 (block 210), where each channel correlation is the correlation of a channel between the network node 120 and one of the wireless devices 110 in the pair 130 and a channel between the network node 120 and the other one of the wireless devices 110 in the pair 130. For example, the network node 120 may estimate the channel correlations by explicitly calculating the channel correlations or the network node may indirectly estimate the channel correlations by calculating a variable representative of the channel correlation, e.g., an orthogonality factor. For the pair 130 formed by wireless device 110A and wireless device 110B, for example, the network node 120 estimates the correlation of the channel between the network node 120 and wireless device 110A and the channel between the network node 120 and wireless device 110B. The network node 120 repeats this estimation for each of the remaining pairs 130, e.g., the pair 130 formed by wireless device 110A and wireless device 110C, the pair 130 formed by wireless device 110D and wireless device 110E, etc. While FIG. 1 only explicitly shows three pairs 130 of wireless devices 110, it will be appreciated that network node 120 estimates the channel correlation for each unique pair of wireless devices 110 served by the network node 120.

Responsive to the channel correlations, the network node 120 assigns one of the available transmission parameters to each wireless device 110 to reduce interference between signals transmitted to the wireless devices 110 (block 220). In exemplary embodiments, each assigned transmission parameter is a combination of a first identifier, e.g., an APID, and a second identifier, e.g., an SCID, where the network node 120 uses the first and second identifiers to code signals for transmission to the corresponding wireless device 110. The network node 120 then configures each wireless device 110 to receive transmissions encoded with the assigned transmission parameter (block 230). For example, the network node 120 may signal the assigned transmission parameter to each wireless device 110, enabling the wireless devices 110 to configure their receivers to use the assigned transmission parameter to decode received signals.

In some embodiments, the network node 120 assigns the transmission parameters responsive to which pairs 130 of wireless devices 110 have the highest channel correlations (block 222), e.g., by assigning transmission parameters with different first identifiers to the wireless devices 110 in the pair 130 having the highest channel correlation, and preferably also having different second identifiers. In alternative or additional embodiments, the network node 120 assigns the transmission parameters responsive to which pairs 130 of wireless devices 110 have the lowest channel correlations (block 224), e.g., by assigning the same transmission parameter to the wireless devices 110 in the pair 130 having the lowest channel correlation.

Figure 3:
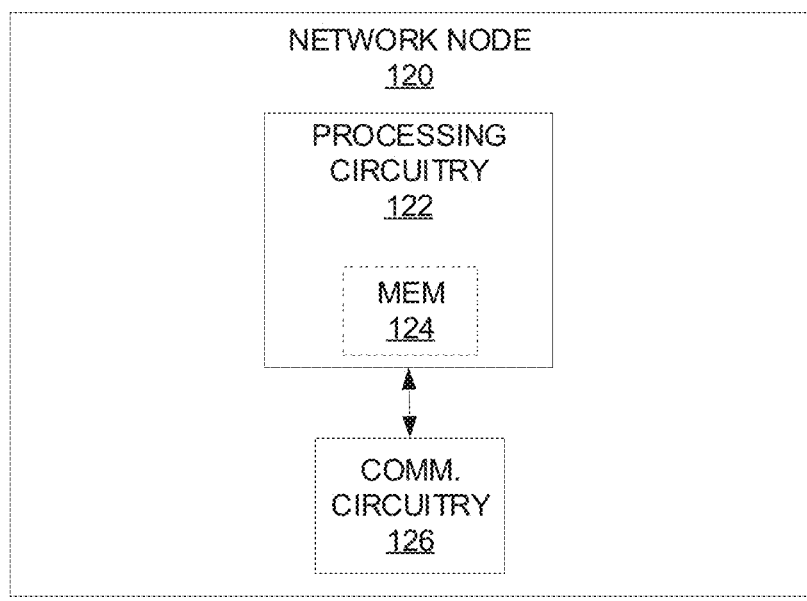
FIG. 3 shows a block diagram of a network node according to one exemplary embodiment.

FIG. 3 shows a block diagram of one exemplary network node 120 according to the solution presented herein. As shown, the network node 120 includes processing circuitry 122 and communication circuitry 126. The communication circuitry 126 (e.g., radio circuitry) is configured to transmit and/or receive signals (e.g., data signals, control signals, etc.) to and/or from one or more other network nodes and/or wireless devices 110, e.g., via any communication technology. Such communication may occur via one or more antennas that are either internal or external to the network node 120. The processing circuitry 122 is configured to perform processing described above (e.g., as shown in FIG. 2), such as by executing instructions stored in memory 124. The processing circuitry 122 in this regard may implement certain functional means, units, circuits, or modules.

Figure 4:
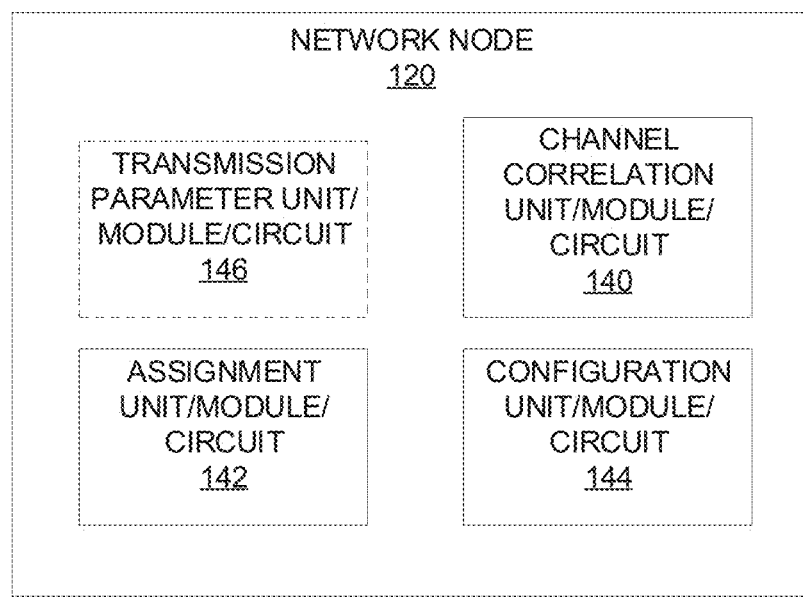
FIG. 4 shows a block diagram of a network node according to another exemplary embodiment.

FIG. 4 shows a schematic block diagram of a network node 120 according to still other exemplary embodiments. As shown, network node 120 implements various functional means, units, circuits, or modules, e.g., via the processing circuitry 122 in FIG. 3 and/or via software code. These functional means, units, circuits, or modules, e.g., for implementing the method(s) herein, include for example: a channel correlation unit/module/circuit 140, an assignment unit/module/circuit 142, a configuration unit/module/circuit 144, and an optional transmission parameter unit/module/circuit 146. The channel correlation unit/module/circuit 140 is configured to estimate a channel correlation for each pair 130 of wireless devices 110, where each pair 130 of wireless devices 110 comprises one of all possible combinations of two of the plurality of wireless devices 110 scheduled by the network node 120. Each channel correlation comprises a channel correlation of a first channel between the network node 120 and one wireless device 110 in the pair 130 and a second channel between the network node 120 and the other wireless device 110 in the pair 130. The assignment unit/ module/circuit 142 is configured to assign one of a plurality of transmission parameters to each of the plurality of wireless devices 110 responsive to the channel correlations to reduce interference between the wireless devices 110. Each transmission parameter comprises a combination of a first identifier and a second identifier, where the first and second identifiers are used to code and/or decode a signal for transmission by the network node 120. The configuration unit/module/circuit 144 is configured to configure each of the plurality of wireless devices 110 to receive transmissions encoded with the assigned transmission parameter. In some embodiments, the network node 120 may further comprise a transmission parameter unit/module/circuit 146, which is configured to determine the set of transmission parameters available to the network node 120, and optionally store them in memory, e.g., memory 124.

As noted above, the network node 120 considers channel correlations when assigning transmission parameters so as to assign the most orthogonal transmission parameters to those wireless devices 110 that most need it, e.g., to wireless devices 110 experiencing high channel correlations. In addition, the solution presented herein may also consider that different types of identifiers used as part of a transmission parameter provide different levels of protection against the interference. For example, each antenna port in the network node 120 is associated with an Orthogonal Cover Code (OCC), where the cross-correlation between OCCs is zero. Further, each scrambling sequence used by the network node 120 is a function of the scrambling identifier, the cell identifier, the cell bandwidth, and the slot index. As such, the scrambling codes generated with identifiers 0 and 1 (e.g., for TM8) will have a cross-correlation higher than zero, but still much lower than 1 (e.g., around 0.09 for 20 MHz). The assignment of transmission parameters having different APIDs therefore provides full orthogonality between the corresponding transmitted signals, while the assignment of transmission parameters having different SCIDs provides near orthogonality between the corresponding transmitted signals. This benefit has been verified in the field, where the throughput between paired wireless devices 110 experiencing high channel correlation (e.g., spatially close together) is the worst when using the same APID and SCID for both wireless devices in the pair 130. Throughput increased when the wireless devices 110 in the pair 130 were assigned APID/SCID combinations having different SCIDs, increased further when the wireless devices 110 in the pair 130 were assigned APID/SCID combinations having different APIDs, and increased further still when the wireless devices 110 in the pair 130 were assigned APID/SCID combinations having different APIDs and SCIDs. Thus, assigning different APIDs to two wireless devices 110 experiencing a high channel correlation, e.g., wireless device 110A and wireless device 110B in FIG. 1, provides better interference protection as compared to assigning different SCIDs, while assigning transmission parameters with different APIDs and different SCIDs to the two wireless devices 110 provides even better interference protection. The network node 120 according to the solution presented herein uses the channel correlation relationship between wireless devices 110, as well as the orthogonality properties of the available identifiers forming the transmission parameters, to determine how best to assign the transmission parameters, including how best to reuse transmission parameters, to reduce interference and/or increase throughput.

As noted above, the network node 120 according to solutions presented herein assigns transmission parameters to co-scheduled wireless devices 110 responsive to channel correlations estimated for each pair 130 of wireless devices 110. It will be appreciated that the transmission parameter assignment may be responsive to any variable that either directly or indirectly represents the channel correlation between each pair 130 of wireless devices 110. For example, in some embodiments the network node 120 may directly use calculated channel correlations to assign the transmission parameters. In other embodiments, the channel correlation may be estimated by other variables, e.g., an Orthogonality Factor (OF), which represents the spatial orthogonality between a pair of wireless devices 110. The spatial orthogonality is directly impacted by the channel correlation (and vice versa), where a high channel correlation corresponds to low spatial orthogonality, which in turn corresponds to a high OF. Because the OF is a variable indicative of the channel correlation at a specific point in time and space, the OF represents an estimate of the channel correlation. The network node 120 may therefore assign transmission parameters responsive to the channel correlations by assigning transmission parameters responsive to the OFs calculated for each pair 130 of wireless devices 110. In exemplary embodiments, the OF may be calculated as the product of the channel estimate for one of the wireless devices 110 in a pair 130 with the conjugate of the channel estimate of the other wireless device 110 in the pair 130, where this product is normalized by the product of the mathematical function norm applied to each channel estimate. As such, the OF will be a value between 0 and 1, where 1 implies no orthogonality (and high channel correlation) and 0 implies perfect orthogonality (and low channel correlation).

For embodiments where the number of wireless devices 110 served by the network node 120 equals or is less than the number of available transmission parameters, the network node 120 can assign a different transmission parameter to each wireless device 110. For example, when the network node 120 serves four (or fewer) wireless devices 110, as shown in FIG. 5, the network node 120 is able to assign a different one of the four available transmission parameters shown in Table 1 to each wireless device 110. It will be appreciated that for clarity purposes, FIG. 5 does not show all possible pairs 130; the solution presented herein would consider pairs 110A/110C and 110B/110D in addition to those explicitly shown in FIG. 5. Because each transmission parameter is different, some level of orthogonality, and thus interference protection, is automatically provided. In these cases, the network node 120 may still use the solution presented herein to make a more intelligent decision regarding the transmission parameter assignment so as to use the transmission parameter assignment to further reduce interference. For example, assume the channel correlation estimations for the example of FIG. 5 show that wireless devices 110B and 110C have the highest channel correlation, wireless devices 110A and 110B have the next highest channel correlation, and wireless devices 110A and 110D have the next highest channel correlation. In this example, the network node 120 may, for example, assign the APID/SCID combination {0,0} to device 110B and {1,1} to device 110C, and then assign APID/SCID combination to device 110A {1,0} (to give it a different APID than device 110B), and then assign APID/SCID combination {0,1} to device 110D (to give it a different APID than device 110A). In so doing, the network node 120 minimizes interference implications for all four of the wireless devices 110.

For embodiments where the number of wireless devices 110 served by the network node 120 is greater than the number of available transmission parameters, the network node 120 must reuse at least some of the transmission parameters. To that end, the network node 120 in some embodiments assigns transmission parameters responsive to the channel correlations until all are assigned, and then starts reassigning transmission parameters responsive to the channel correlations. It will be appreciated, however, that the network node is not required to use (or reuse) all transmission parameters before starting to reuse the transmission parameters (or reuse them again).

Consider an example where the network node 120 only has four different transmission parameters available (e.g., Table 1), but serves eight wireless devices 110, e.g., the eight wireless devices 110A-110H of FIG. 1. In this example, the network node 120 estimates the channel correlation for each possible wireless device pair 130 that can be formed from the eight wireless devices 110. Table 2 shows the results of exemplary channel correlation estimations, where each estimated channel correlation is represented as an Orthogonality Factor (OF), and where the pair 130 with the highest channel correlation has the least spatial orthogonality, and thus has the highest OF. It will be appreciated that while Table 2 shows each of the wireless device pairs 130 ordered according to the corresponding OF (lowest to highest), the network node 120 does not have to execute any type of ordering process; Table 2 is provided for illustrative purposes only. It will further be appreciated that while FIG. 1 shows eight wireless devices 110A-110H, the position of these wireless devices 110 in the network 100 does not necessarily correspond to the OFs of Table 2.

TABLE 2

| WD PAIRS | OF | WD PAIRS | OF |
|---|---|---|---|
| 110D, 110G | 0x0064 | 110G, 110H | 0x0110 |
| 110C, 110G | 0x0079 | 110B, 110H | 0x0124 |
| 110A, 110G | 0x008e | 110A, 110B | 0x0134 |
| 110C, 110E | 0x008e | 110F, 110H | 0x0135 |
| 110D, 110H | 0x0094 | 110A, 110F | 0x013a |
| 110A, 110E | 0x0096 | 110E, 110F | 0x0169 |
| 110D, 110E | 0x00a5 | 110B, 110D | 0x016e |
| 110D, 110F | 0x00ac | 110B, 110F | 0x0184 |
| 110A, 110H | 0x00e4 | 110F, 110G | 0x0224 |
| 110C, 110F | 0x00e5 | 110E, 110G | 0x026b |
| 110B, 110G | 0x00f0 | 110B, 110C | 0x027e |
| 110C, 110D | 0x00f1 | 110A, 110D | 0x0288 |
| 110B, 110E | 0x0108 | 110A, 110C | 0x03a4 |
| 110C, 110H | 0x010f | 110E, 110H | 0x03ba |

It is clear from Table 2 that the pair 130 formed by wireless device 110E and wireless device 110H has the highest OF, and thus has the highest channel correlation. Table 2 further shows that the pair 130 formed by wireless device 110A and wireless device 110C has the next highest OF, that the pair 130 formed by wireless device 110A and wireless device 110D has the next highest OF, etc. To minimize interference, network node 120 assigns the APID/SCID combination {0,0} to either wireless device 110E or wireless device 110H, and assigns the APID/SCID combination {1,1} to the other of wireless device 110E or wireless device 110H. Because the pair 130 having the next highest OF includes two wireless devices 110 that have not yet been assigned an APID/SCID combination, the network node 120 assigns one of the two remaining APID/SCID combinations to devices 110A and 110C, e.g., {1,0} to wireless device 110C and {0,1} to wireless device 110A. The pair 130 with the next highest OF, wireless devices 110A and 110D, includes a wireless devices 110A that has already been assigned an APID/SCID combination. Further, all APID/SCID combinations have already been assigned once. Thus, the network node 120 reuses one of the already assigned APID/SCID combinations for wireless device 110D that at least has a different APID than wireless device 110A, e.g., APID/SCID combination {1,0} or {1,1}. The network node 120 continues this iterative process, reusing the APID/SCID combinations but basing the selection on the OF, until all wireless devices 110 have been assigned an APID/SCID combination. Table 3 shows exemplary transmission parameter assignments resulting for the example of Table 2.

TABLE 3

| APID | SCID | WDs |
|---|---|---|
| 0 | 0 | 110E, 110B |
| 1 | 1 | 110H, 110D |
| 0 | 1 | 110A, 110F |
| 1 | 0 | 110C, 110G |

Figure 6:
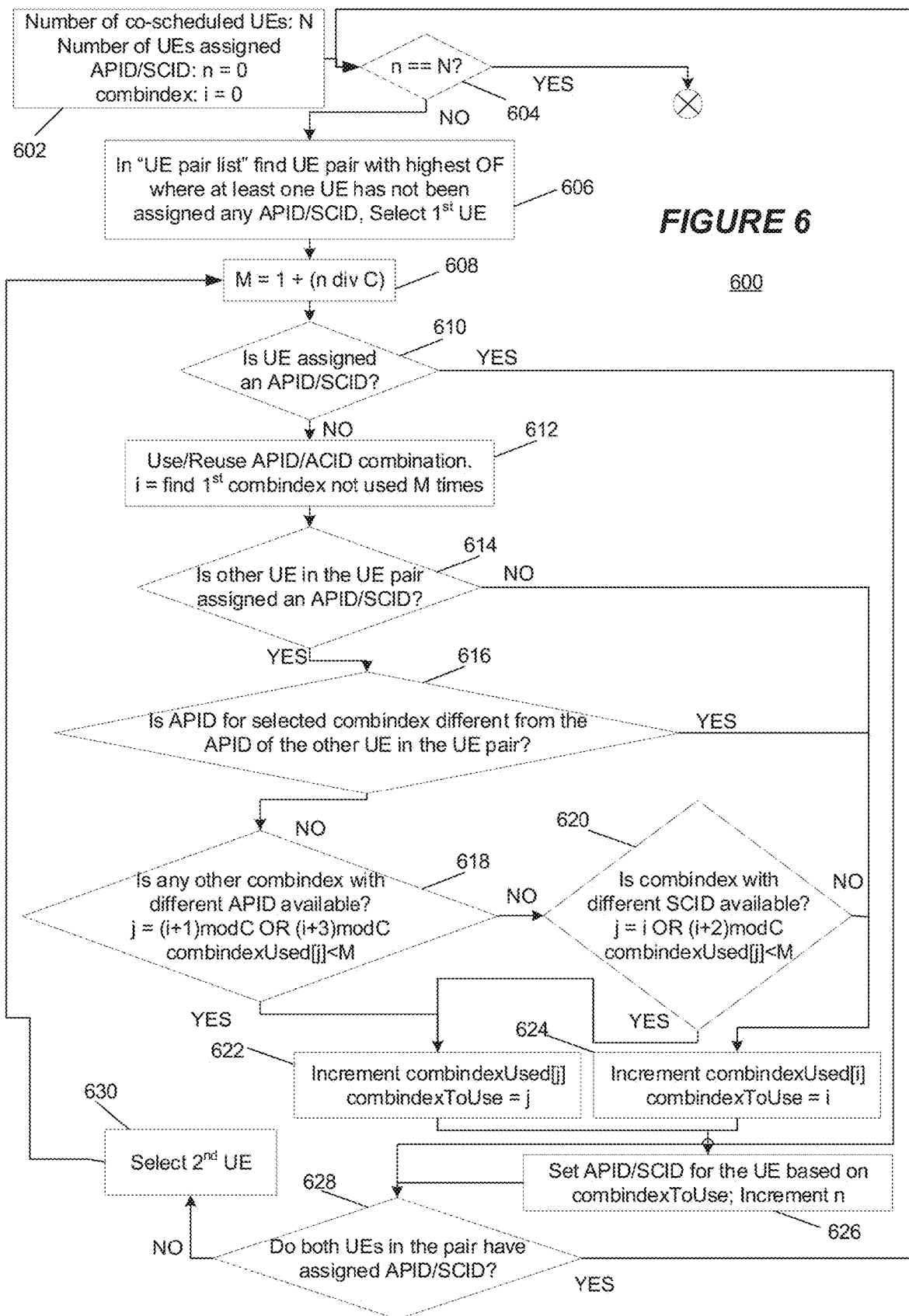
FIG. 6 shows a method of configuring a plurality of wireless devices in the wireless network according to another exemplary embodiment.

In some embodiments, the network node 120 assigns each available transmission parameter before reusing any of the transmission parameters, e.g., as shown in the example for Table 3 and/or the example of FIG. 6. It will be appreciated, however, that such is not required. In some embodiments, it may be beneficial for the network node 120 to reuse an already assigned transmission parameter before all available transmission parameters have been initially assigned. For example, when the APID/SCID combinations {0,0}, {1,1}, and {0,1} have already been assigned, it may be more beneficial for the network node 120 to reuse {0,0} for a wireless device 110 when the pair 130 of wireless devices being considered includes a wireless device 110 already assigned {1,1} than for the network node 120 to use the not-yet-assigned {1,0}. Similarly, the network node 120 need not reuse all available transmission parameters e.g., a second time before choosing to reuse some transmission parameters e.g., a third time. Thus, it will be appreciated that the solution presented herein enables the network node 120 to assign the best available transmission parameter to each wireless device 110 responsive to the channel correlations for each pair 130 of wireless devices.

Figure 7:
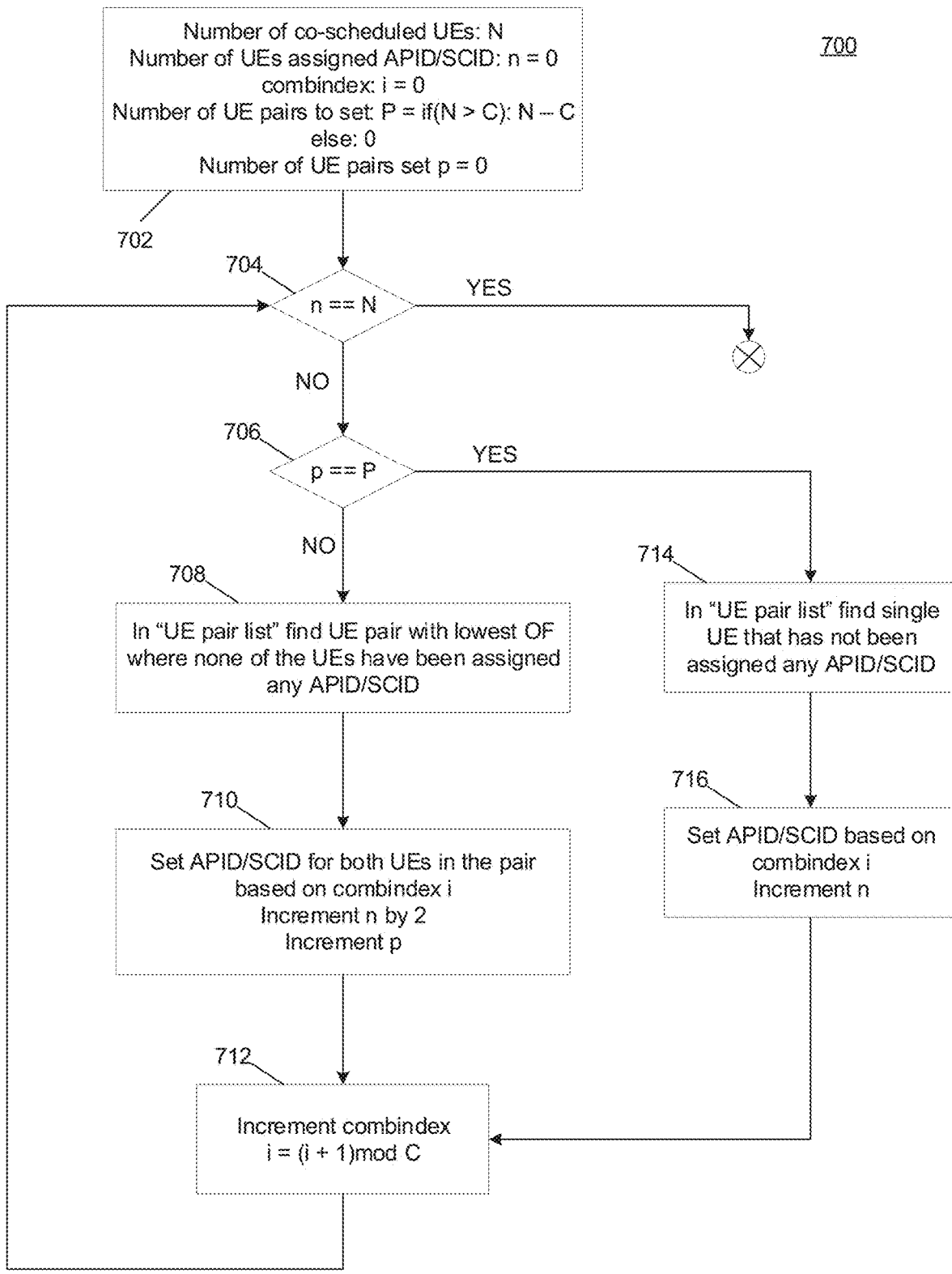
FIG. 7 shows a method of configuring a plurality of wireless devices in the wireless network according to another exemplary embodiment.

While the solution presented herein generally applies to any implementation where the network node 120 assigns any transmission parameters to its wireless devices 110 response to channel correlations between pairs 130 of wireless devices 110, FIGS. 6 and 7 provide detailed examples for implementing the solution presented herein, where FIG. 6 focuses on transmission parameter assignment based on the highest channel correlations, and FIG. 7 focuses on transmission parameter assignment based on the lowest channel correlations. The examples of FIGS. 6 and 7 are for illustrative purposes, and should not be considered as limiting.

According to the exemplary implementation of FIG. 6, method 600 starts (after all channel correlations have been estimated) by defining the number (N) of co-scheduled wireless devices 110 served by the network node 120, and initializing the index n representing the number of wireless devices 110 assigned an APID/SCID combination and the index i for the APID/SCID combinations ("combindex") to 0 (block 602). For FIG. 6, the associations in Table 4 are used, where C represents the number of unique APID/SCID combinations, where in this example, C=4.

TABLE 4

| Combindex i | APID | SCID |
| --- | --- | --- |
| 0 | 0 | 0 |
| 1 | 1 | 1 |
| 2 | 0 | 1 |
| 3 | 1 | 0 |

For the example of FIG. 6, having an array combindexused[C=4]={0,0,0,0} specifies how many times a certain combindex has been allocated to a wireless device 110, and M specifies if a specific combindex is free to reuse when combindexused[i]<M, where M is incremented when all combindex have been used the same number of times. The network node 120 implements blocks 604-630 until index n equals N (block 604). The network node 120 identifies the pair 130 having the highest OF (i.e., the highest channel correlation), where at least one device 110 in the pair 130 has not yet been assigned, and selects a first one of the wireless devices 110 in the pair 130 (block 606). The network node then assigns an APID/SCID combination to each wireless devices 110 in the pair 130 so that when possible, the devices in the pair 130 have at least a different APID (block 618) and/or a different SCID (block 620) when possible (blocks 612-630). Once both wireless devices 110 in the pair 130 have been assigned an APID/SCID combination (block 628), the network node 120 repeats the process (blocks 606-630) for the next highest pair 130 of wireless devices 110 until n=N (block 604).

According to the exemplary implementation of FIG. 7, method 700 starts (after all channel correlations have been estimated) by defining the number (N) of co-scheduled wireless devices 110 served by the network node 120 and the number of pairs (P) 130 of wireless devices 110 to be assigned an APID/SCID combination, and initializing the index n for the wireless devices 110, the index i for the APID/SCID combinations ("combindex"), and the index for the number of pairs 130 p to 0 (block 702). FIG. 7 also uses the associations in Table 4. For the example of FIG. 7, C=4 represents the number of different APID/SCID combinations. As long as p is not equal to P and n is not equal to N (blocks 704 and 706), the network node 120 executes the steps in blocks 708-712 to assign an APID/SCID combination to each wireless devices 110 responsive to the lowest OF (i.e., the lowest channel correlations). In particular, for the pair 130 currently having the lowest OF, where neither wireless device 110 has been assigned an APID/SCID combination (block 708), the network node 120 assigns both devices in the pair 130 to the same APID/SCID combination based on the current APID/SCID combindex i, increments n by 2, and increments p (block 710) and increments the APID/SCID combination combindex i (block 712). When p=P, the network node 120 looks for any remaining wireless devices 110 not yet assigned an APID/SCID combination (block 714), and assigns the APID/SCID combination for that wireless device 110 based on the current APID/SCID combindex i, and increments n (block 716).

In some embodiments, the network node 120 may assign APID/SCID combinations to some wireless devices 110 responsive to the identification of the pairs 130 having the highest channel correlation, and then may assign APID/SCID combinations to other wireless devices 110 responsive to the identification of pairs 130 having the lowest channel correlation. Thus, the network node 120 may use both of the implementations of blocks 222 and 224 in FIG. 2 (and/or both of the exemplary implementations of FIGS. 6 and 7) when assigning transmission parameters to co-scheduled wireless devices 110. For example, referring back to Table 2, the network node 120 may respectively assign the APID/SCID combinations {1,1} and {0,0} to the wireless devices 110 in the pair 130 having the highest channel correlation, e.g., devices 110E and 110H, and may assign identical APID/SCID combinations, e.g., {1,0} to the wireless devices 110 in the pair 130 having the lowest channel correlation, e.g., devices 110D and 110G.

In some embodiments, the network node 120 may only apply the solution presented herein to some of the wireless devices 110, e.g., only to those wireless devices having channel correlation estimations meeting or exceeding a correlation threshold. For example, the network node 120 (e.g., the assignment unit/module/circuit 142) compare the correlation estimations to a threshold, e.g., the correlation threshold, and may assign different ones of the plurality of transmission parameters to the wireless devices 110 in each pair 130 of wireless devices having a channel correlation estimation that meets or exceeds the correlation threshold. For the wireless devices 110 in each pair 130 of wireless devices having a channel correlation estimation that is less than the correlation threshold, the network node 120 may assign any of the plurality of transmission parameters.

By using channel correlations when assigning transmission parameters to the wireless devices 110 served by the network node 120, the network node 120 improves the orthogonality of the transmitted signals for those signals that need it most, e.g., those experiencing the highest channel correlations. In so doing, the network node 120 reduces interference, and thus increases throughput.

As used herein, network node 120 refers to any equipment capable, configured, arranged, and/or operable to communicate directly or indirectly with a wireless device 110 and/or with other network nodes or equipment in the wireless network 100 to enable and/or provide wireless access to the wireless device 110 and/or to perform other functions (e.g., administration) in the wireless network 100. Examples of network nodes 120 include, but are not limited to, access points (APs) (e.g., radio access points), base stations (BSs) (e.g., radio base stations, Node Bs, evolved Node Bs (eNBs) and NR NodeBs (gNBs)), etc. Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node 120 may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes 120 include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node 120 may be a virtual network node as described in more detail below. More generally, however, network nodes 120 may represent any suitable device (or group of devices) capable, configured, arranged, and/or operable to enable and/or provide a wireless device 110 with access to the wireless network 100 or to provide some service to a wireless device 110 that has accessed the wireless network 100.

As used herein, wireless device 110 refers to a device capable, configured, arranged and/or operable to communicate wirelessly with network nodes 120 and/or other wireless devices 110. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device 110 may be configured to transmit and/or receive information without direct human interaction. For instance, a wireless device 110 may be designed to transmit information to a network node 120 on a predetermined schedule, when triggered by an internal or external event, or in response to requests from the network node 120. Examples of a wireless device 110 include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless device, etc. A wireless device 110 may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device 110 may represent a machine or other device that performs monitoring and/or measurements, and transmits the results of such monitoring and/or measurements to another wireless device 110 and/or a network node 120. The wireless device 110 may in this case be a machine-to-machine (M2M) device, which may in a 3GPP context be referred to as an MTC device. As one particular example, the wireless device 110 may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device 110 may represent a vehicle or other equipment that is capable of monitoring and/or reporting on its operational status or other functions associated with its operation. A wireless device 110 as described above may represent the endpoint of a wireless connection, in which case the device may be referred to as a wireless device. Furthermore, a wireless device 110 as described above may be mobile, in which case it may also be referred to as a mobile device or a mobile terminal.

It is to be understood that network node 120 comprises any suitable combination of hardware and/or software needed to perform the tasks, features, functions and methods disclosed herein. Moreover, while the components of network node 120 are depicted as single boxes located within a larger box, or nested within multiple boxes, in practice, a network node 120 may comprise multiple different physical components that make up a single illustrated component (e.g., a device readable medium may comprise multiple separate hard drives as well as multiple RAM modules).

Similarly, network node 120 may be composed of multiple physically separate components (e.g., a NodeB component and a RNC component, or a BTS component and a BSC component, etc.), which may each have their own respective components. In certain scenarios in which network node 120 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 120 may be configured to support multiple radio access technologies (RATs). In such embodiments, some components may be duplicated (e.g., separate device readable medium for the different RATs) and some components may be reused (e.g., the same antenna may be shared by the RATs). Network node 120 may also include multiple sets of the various components for different wireless technologies integrated into network node 120, such as, for example, GSM, WCDMA, LTE, NR, WiFi, or Bluetooth wireless technologies. These wireless technologies may be integrated into the same or different chip or set of chips and other components within network node 120.

The solution presented herein may, of course, be carried out in other ways than those specifically set forth herein without departing from essential characteristics of the disclosed solution. The present embodiments are to be considered in all respects as illustrative and not restrictive, and all changes coming within the meaning and equivalency range of the appended claims are intended to be embraced therein.

What is claimed is:

1. A method implemented by a network node for configuring a plurality of wireless devices in a Multi-User Multiple-Input, Multiple-Output (MU-MIMO) wireless communication network to receive transmissions from the network node, the method comprising:

for each pair of wireless devices, estimating a channel correlation of a first channel between the network node and one wireless device in the pair and a second channel between the network node and the other wireless device in the pair, where each pair of wireless devices comprises one of all possible combinations of two of the plurality of wireless devices;

assigning one of a plurality of transmission parameters to each of the plurality of wireless devices responsive to the channel correlations to reduce interference between the plurality of wireless devices, each transmission parameter being a combination of a first identifier and a second identifier, the first and second identifiers used to code and/or decode a signal; and configuring each of the plurality of wireless devices to receive transmissions encoded with the assigned transmission parameter.

2. The method of claim 1, wherein the first identifier is an antenna port identifier and wherein the second identifier is a scrambling code identifier.

3. The method of claim 1, wherein said assigning one of the plurality of transmission parameters to each of the plurality of wireless devices comprises assigning, to the wireless devices in the pair of wireless devices having the highest channel correlation, a first transmission parameter to one of the wireless devices in the pair and a second transmission parameter to the other of the wireless devices in the pair, the second transmission parameter having a different first identifier than the first transmission parameter.

4. The method of claim 3, wherein the second transmission parameter further has a different second identifier than the first transmission parameter.

5. The method of claim 1:
wherein the plurality of transmission parameters comprises M unique transmission parameters; and
wherein said assigning one of the plurality of transmission parameters to each of the plurality of wireless devices comprises assigning a different one of the M unique transmission parameters to each of up to M unique wireless devices in the one or more pairs of wireless devices having the highest channel correlations.

6. The method of claim 5, wherein the transmission parameters assigned to at least the wireless devices in the pair of wireless devices having the highest channel correlation have different first identifiers.

7. The method of claim 5:
wherein the plurality of wireless devices comprises more than M wireless devices; and
wherein said assigning one of the plurality of transmission parameters to each of the plurality of wireless devices further comprises reusing the M unique transmission parameters for the wireless devices not yet assigned a transmission parameter responsive to the channel correlations.

8. The method of claim 7, wherein said reusing the M unique transmission parameters comprises, for one or more additional pairs of wireless devices having the next highest channel correlations and having M or fewer wireless devices not yet assigned one of the plurality of transmission parameters, assigning, responsive to the channel conditions, a different one of the M unique transmission parameters to each of the M or fewer wireless devices not already assigned one of the plurality of transmission parameters in the one or more additional pairs of wireless devices.

9. The method of claim 1, wherein said assigning one of the plurality of transmission parameters to each of the plurality of wireless devices comprises:
for the wireless devices in the pair of wireless devices having the highest channel correlation, assigning a first transmission parameter to one of the wireless devices in the pair and a second transmission parameter to the other of the wireless devices in the pair, the second transmission parameter having a different first identifier than the first transmission parameter;
for the wireless devices in the one or more pairs of wireless devices having the next highest channel correlation(s), assigning, responsive to the channel correlations, any remaining unassigned transmission parameters to the wireless devices not yet assigned a transmission parameter until all unique transmission parameters have been assigned; and
for any of the plurality of wireless devices in the remaining pairs of wireless devices having at least one unassigned wireless device, reusing the already assigned transmission parameters by assigning, responsive to the corresponding channel correlations, one of the already assigned plurality of transmission parameters to each of the remaining plurality of wireless devices not yet assigned a transmission parameter until all of the plurality of wireless devices are assigned a transmission parameter.

10. The method of claim 9, wherein the second transmission parameter further has a different second identifier than the first transmission parameter.

11. The method of claim 1 further comprising comparing each estimated channel correlation to a correlation threshold, wherein the assigning one of the plurality of transmission parameters to each of the plurality of wireless devices comprises:
assigning different ones of the plurality of transmission parameters to the wireless devices in each pair of wireless devices having an estimated channel correlation that meets or exceeds the correlation threshold; and
assigning any of the plurality of transmission parameters to the wireless devices in each pair of wireless devices having an estimated channel correlation that is less than the correlation threshold.

12. The method of claim 1, wherein said assigning one of the plurality of transmission parameters to each of the plurality of wireless devices comprises assigning, to the wireless devices in the pair of wireless devices having the lowest channel correlation, a first transmission parameter to one of the wireless devices in the pair and a second transmission parameter to the other of the wireless devices in the pair, the second transmission parameter being the same as the first transmission parameter.

13. The method of claim 12, wherein the second transmission parameter further has the same second identifier as the first transmission parameter.

14. A non-transitory computer-readable medium comprising a computer program product for controlling a network node in a Multi-User Multiple-Input, Multiple-Output (MU-MIMO) wireless communication network configured to send transmissions to a plurality of wireless devices, the computer program product comprising software instructions which, when run on processing circuitry in the network node, causes the network node to:
for each pair of wireless devices, estimate a channel correlation of a first channel between the network node and one wireless device in the pair and a second channel between the network node and the other wireless device in the pair, where each pair of wireless devices comprises one of all possible combinations of two of the plurality of wireless devices;
assign one of a plurality of transmission parameters to each of the plurality of wireless devices responsive to the channel correlations to reduce interference between the plurality of wireless devices, each transmission parameter being a combination of a first identifier and a second identifier, the first and second identifiers used to code and/or decode a signal; and
configure each of the plurality of wireless devices to receive transmissions encoded with the assigned transmission parameter.

15. A network node for configuring a plurality of wireless devices in a Multi-User Multiple-Input, Multiple-Output (MU-MIMO) wireless communication network to receive transmissions from the network node, the network node comprising:
a channel correlation circuit configured to, for each pair of wireless devices, estimate a channel correlation of a first channel between the network node and one wireless device in the pair and a second channel between the network node and the other wireless device in the pair, where each pair of wireless devices comprises one of all possible combinations of two of the plurality of wireless devices;
an assignment circuit configured to assign one of a plurality of transmission parameters to each of the plurality of wireless devices responsive to the channel correlations to reduce interference between the plurality of wireless devices, each transmission parameter being a combination of a first identifier and a second identifier, the first and second identifiers used to code and/or decode a signal; and a configuration circuit configured to configure each of the plurality of wireless devices to receive transmissions encoded with the assigned transmission parameter.

16. The network node of claim 15, wherein the first identifier is an antenna port identifier, and wherein the second identifier is a scrambling code identifier.

17. The network node of claim 15, wherein the assignment circuit assigns one of the plurality of transmission parameters to each of the plurality of wireless devices by assigning, to the wireless devices in the pair of wireless devices having the highest channel correlation, a first transmission parameter to one of the wireless devices in the pair and a second transmission parameter to the other of the wireless devices in the pair, the second transmission parameter having a different first identifier than the first transmission parameter.

18. The network node of claim 17, wherein the second transmission parameter further has a different second identifier than the first transmission parameter.

19. The network node of claim 15:
wherein the plurality of transmission parameters comprises M unique transmission parameters; and
wherein the assignment circuit assigns one of the plurality of transmission parameters to each of the plurality of wireless devices by assigning a different one of the M unique transmission parameters to each of up to M unique wireless devices in the one or more pairs of wireless devices having the highest channel correlations.

20. The network node of claim 19, wherein the transmission parameters assigned to at least the wireless devices in the pair of wireless devices having the highest channel correlation have different first identifiers.

21. The network node of claim 19:
wherein the plurality of wireless devices comprises more than M wireless devices; and
wherein the assignment circuit further assigns one of the plurality of transmission parameters to each of the plurality of wireless devices by reusing the M unique transmission parameters for the wireless devices not yet assigned a transmission parameter responsive to the channel correlations.

22. The network node of claim 21, wherein the assignment circuit reuses the M unique transmission parameters by, for one or more additional pairs of wireless devices having the next highest channel correlations and having M or fewer wireless devices not yet assigned one of the plurality of transmission parameters, assigning, responsive to the channel conditions, a different one of the M unique transmission parameters to each of the M or fewer wireless devices not already assigned one of the plurality of transmission parameters in the one or more additional pairs of wireless devices.

23. The network node of claim 15, wherein the assignment circuit assigns one of the plurality of transmission parameters to each of the plurality of wireless devices by:
for the wireless devices in the pair of wireless devices having the highest channel correlation, assigning a first transmission parameter to one of the wireless devices in the pair and a second transmission parameter to the other of the wireless devices in the pair, the second transmission parameter having a different first identifier than the first transmission parameter;
for the wireless devices in the one or more pairs of wireless devices having the next highest channel correlation(s), assigning, responsive to the channel correlations, any remaining unassigned transmission parameters to the wireless devices not yet assigned a transmission parameter until all unique transmission parameters have been assigned; and
for any of the plurality of wireless devices in the remaining pairs of wireless devices having at least one unassigned wireless device, reusing the already assigned transmission parameters by assigning, responsive to the corresponding channel correlations, one of the already assigned plurality of transmission parameters to each of the remaining plurality of wireless devices not yet assigned a transmission parameter until all of the plurality of wireless devices are assigned a transmission parameter.

24. The network node of claim 23, wherein the second transmission parameter further has a different second identifier than the first transmission parameter.

25. The network node of claim 15, wherein the assignment circuit is further configured to compare each estimated channel correlation to a correlation threshold, wherein the assignment circuit assigns one of the plurality of transmission parameters to each of the plurality of wireless devices by:
assigning different ones of the plurality of transmission parameters to the wireless devices in each pair of wireless devices having an estimated channel correlation that meets or exceeds the correlation threshold; and
assigning any of the plurality of transmission parameters to the wireless devices in each pair of wireless devices having an estimated channel correlation that is less than the correlation threshold.

26. The network node of claim 15, wherein the assignment circuit assigns one of the plurality of transmission parameters to each of the plurality of wireless devices by assigning, to the wireless devices in the pair of wireless devices having the lowest channel correlation, a first transmission parameter to one of the wireless devices in the pair and a second transmission parameter to the other of the wireless devices in the pair, the second transmission parameter being the same as the first transmission parameter.

27. The network node of claim 26, wherein the second transmission parameter further has the same second identifier as the first transmission parameter.

* * * * *